(12) United States Patent
Poloni (10) Patent No.: US 7,953,379 B2
(45) Date of Patent: May 31, 2011

(54) METHOD AND SYSTEM FOR CALIBRATING QUADRATURE MODULATORS

(75) Inventor: Angelo Poloni, Fino del Monte (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 728 days.

(21) Appl. No.: 12/040,712

(22) Filed: Feb. 29, 2008

(65) Prior Publication Data

US 2009/0221247 A1    Sep. 3, 2009

(51) Int. Cl.
*H04B 17/00* (2006.01)
*H04L 27/36* (2006.01)

(52) U.S. Cl. .............. 455/115.1; 455/115.2; 375/298

(58) Field of Classification Search .......... 455/67.11, 455/67.14, 115.1, 115.2, 115.3; 375/295, 375/296, 298
See application file for complete search history.

(56) References Cited

U.S. PATENT DOCUMENTS

| | | | |
|---|---|---|---|
| 6,058,291 A * | 5/2000 | Ketcham | 455/46 |
| 6,265,949 B1 * | 7/2001 | Oh | 332/103 |
| 6,421,397 B1 * | 7/2002 | McVey | 375/308 |
| 6,574,286 B2 * | 6/2003 | McVey | 375/308 |
| 6,704,551 B2 * | 3/2004 | Riou et al. | 455/115.1 |
| 6,771,709 B2 * | 8/2004 | Huang et al. | 375/296 |
| 7,548,591 B2 * | 6/2009 | Parsa et al. | 375/298 |
| 7,734,261 B2 * | 6/2010 | Bury | 455/115.1 |
| 2009/0221246 A1 * | 9/2009 | Poloni et al. | 455/115.2 |

OTHER PUBLICATIONS

Cavers, J. K., "New Methods for Adaption of Quadrature Modulators and Demodulators in Amplifier Linearization Circuits," Transaction on Vehicular Technology, vol. 46, No. 3, Aug. 1997, pp. 707-716.
Craninckx, Jan; Debaillie, Bjorn; Come, Boris; Donnay, Stephane, "A WLAN Direct Upconversion Mixer with Automatic Calibration," 2005 IEEE International Solid-State Circuits Conference, Session 29, RF Techniques, 29.9, 0-7803-8904-2/05, Feb. 9, 2005, pp. 546-547 and 618.

* cited by examiner

*Primary Examiner* — Sonny Trinh
(74) *Attorney, Agent, or Firm* — Lisa K. Jorgenson; Kevin D. Jablonski; Graybeal Jackson LLP (57) ABSTRACT

A calibration method for reducing modulation errors in a telecommunication transmitter apparatus includes providing a plurality of pairs of test signals; the test signals of each pair are substantially in quadrature to each other, and the pairs of test signals are at least in part different with all the pairs of test signals that have a substantially equal energy. A plurality of modulated signals are generated, with each modulated signal that is generated by modulating a corresponding pair of test signals. A plurality of transformed signals are calculated, each one corresponding to the square of a corresponding modulated signal in the frequency domain. A plurality of partial error indicators are calculated, each one as a function of the modulus of a corresponding transformed signal. The partial error indicators are indicative of the modulation errors associated with the modulated signals. A compensation for counterbalancing the modulation errors is calculated according to a combination of the partial error indicators and an indication of the compensation is stored for the application of the compensation to each further pair of operative signals during operation of the telecommunication transmitter apparatus.

19 Claims, 4 Drawing Sheets

METHOD AND SYSTEM FOR CALIBRATING QUADRATURE MODULATORS

TECHNICAL FIELD

Embodiments of the present invention relate to the telecommunication field. More particularly, embodiments of the present invention relate to the calibration of transmitter apparatuses.

BACKGROUND

Modern wireless telecommunication systems need to guarantee transmissions with data transfer rates as high as possible; at the same time, they need to be designed in such a way to be cost-effective and to require low power consumptions.

For these reasons, systems based on the homodyne architecture are nowadays extensively exploited. Homodyne systems are based on a so-called direct conversion method, according to which a receiver directly converts the received signals from a carrier Radio Frequency (RF) to a base-band frequency. In this way, only one mixer stage is usually required in the receiver, thereby resulting in lower power consumption and easier implementation of the receiver in an integrated form. Therefore, homodyne systems allow avoiding the use of expensive intermediate-frequency filters, which are instead required in the heterodyne architectures.

Among the various known homodyne systems, an important class thereof includes the ones based on quadrature transmitters. As it is well known to those skilled in the art, a quadrature transmitter usually includes one or more quadrature modulators, which receive two base-band signals to be transmitted and generate a corresponding modulated signal. More particularly, the base-band signals are brought to the RF domain used for the transmission by properly modulating them with a corresponding carrier wave, so that the resulting signals are in quadrature to each other; then, the signals in quadrature are mixed together to form the modulated signal.

For example, the base-band signals of a typical quadrature homodyne architecture may be generated exploiting the so-called Orthogonal Frequency-Division Multiplexing (OFDM) technique, which is a particular digital modulation scheme that makes use of a large number of closely-spaced sinusoidal waves; alternatively, the base band signals may by generated by filtering Binary Phase-Shift Keying (BPSK) sequences using Nyquist shapes or by exploiting other known techniques.

However, the occurrence of imperfections in real quadrature modulators, such as gain and phase imbalances, generates corresponding gain and phase errors in the modulated signal; the gain and phase errors may have a detrimental effect on the system performance. Compensation for these errors, either with digital signal processors or analog circuits, is essential in order to meet the stringent out-of-band emission requirements of modern wireless telecommunication systems.

In order to mitigate this problem, a possible solution is of pre-compensating the base-band signals to be modulated so as to counterbalance the gain and phase errors; for this purpose a proper compensation is applied to the base-band signals, which compensation is quantified according to an estimate of the gain and phase errors.

For example, the document "New Methods for Adaptation of Quadrature Modulators and Demodulators in Amplifier Linearization Circuits" by J. K. Cavers discloses a method for compensating the gain and phase errors of quadrature modulators, which method make uses of a closed feedback measure loop. In particular, the method provides for feeding the quadrature modulator with a base-band test signal, which is modulated to obtain a corresponding RF signal; then, the RF signal is provided to an envelope detector, in such a way to obtain an indication of the gain and phase errors generated by the imperfections of the modulator. However, the output of the modulator is phase-dependant, since it depends on the test signal; thus the method requires the exact knowledge of a measure of the loop's delay, which is usually not available. An alternative solution provided by the method consists of the transmission of a dc tone in the base-band and then in the performing of measures with a "step and measure" technique. This last operation cannot be easily performed in OFDM systems, since the dc tone—corresponding to the frequency of the carrier—is usually removed by the circuits adapted to couple the base-band section with the RF section.

A different approach is disclosed in the document "A WLAN Direct Upconversion Mixer with Automatic Calibration" by Jan Craninckx, Bjorn Debaillie, Boris Come and Stephane Donnay. According to this approach, the modulated signal generated by the modulator is fed back to the inputs of the modulator, and the output thereof is used for estimating the compensation. The main drawback of this approach regards its hardware implementation, since a measure loop used for this approach has to include switches that need to be perfectly insulated.

SUMMARY

In view of the above the Applicant has tackled the problem of improving the efficiency of calibration solutions that are aimed at counterbalancing the modulation errors.

More specifically, an embodiment of the present invention provides a calibration method for reducing modulation errors in a telecommunication transmitter apparatus. The calibration method includes the step of providing a plurality of pairs of test signals; the test signals of each pair are substantially in quadrature to each other, and the pairs of test signals are at least in part different with all the pairs of test signals that have a substantially equal energy. The method further includes the steps of generating a plurality of modulated signals, with each modulated signal that is generated by modulating a corresponding pair of test signals; calculating a plurality of transformed signals each one corresponding to the square of a corresponding modulated signal in the frequency domain; and calculating a plurality of partial error indicators each one as a function of the modulus of a corresponding transformed signal. The partial error indicators are indicative of the modulation errors associated with the modulated signals. The method still further includes the steps of calculating a compensation for counterbalancing the modulation errors according to a combination of the partial error indicators and storing an indication of the compensation for the application of the compensation to each further pair of operative signals during operation of the telecommunication transmitter apparatus.

Another embodiment of the present invention provides a computer program to be executed on a calibration system for causing the system to perform the calibration method.

A further embodiment of the invention provides a calibration system.

A still further embodiment of the present invention provides a transmitter apparatus including the calibration system.

BRIEF DESCRIPTION OF THE DRAWINGS

The invention itself, as well as further features and the advantages thereof, will be best understood with reference to the following detailed description of embodiments thereof, given purely by way of a non-restrictive indication, to be read in conjunction with the accompanying drawings. Particularly.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
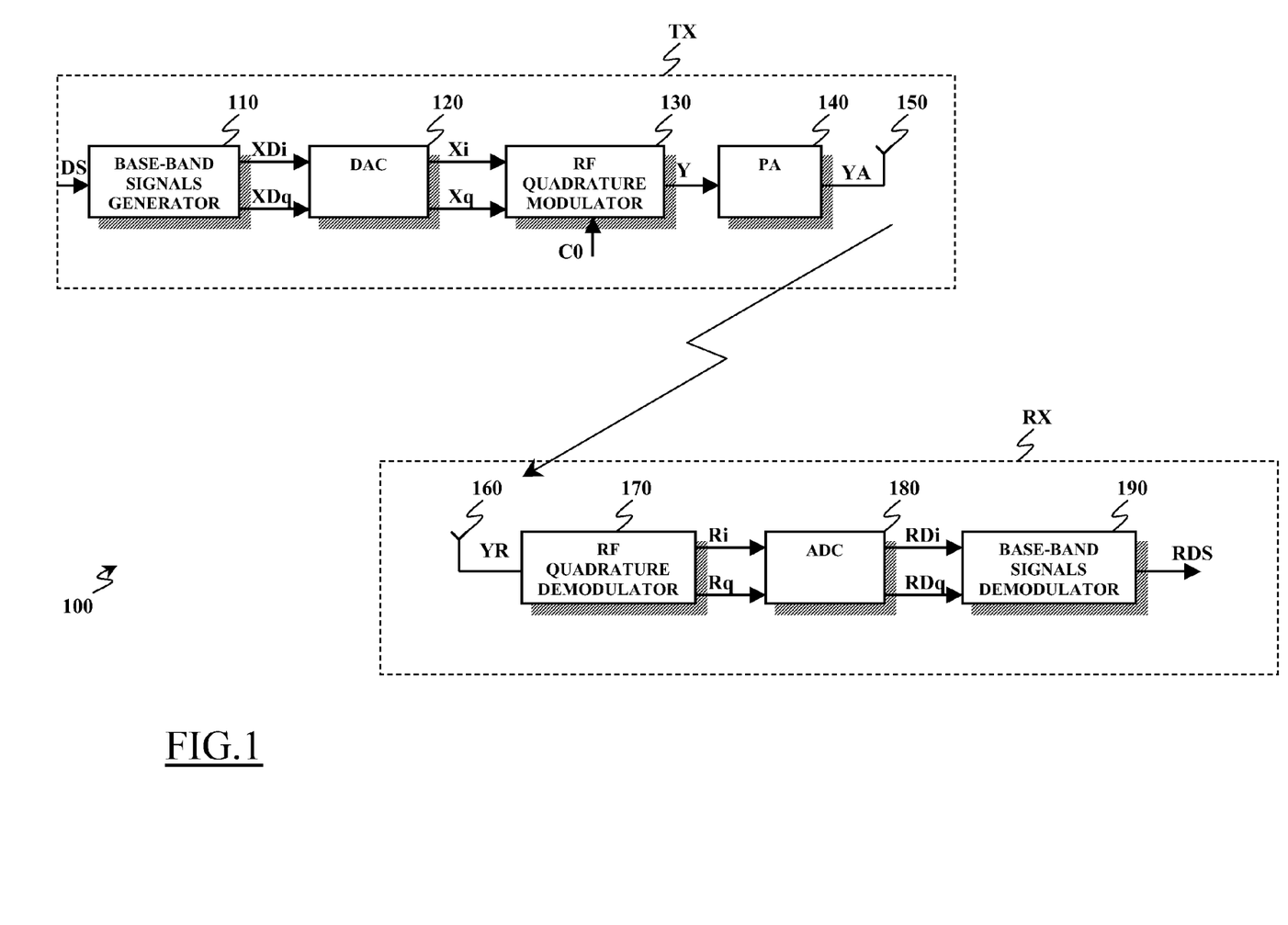
FIG. 1 schematically illustrates, in terms of functional blocks, the main components of a wireless homodyne telecommunication system in which calibration methods according to embodiments of the present invention can be used.

With reference to the drawings, FIG. 1 schematically shows, in terms of functional blocks, the main components of a wireless homodyne telecommunication system 100 in which the calibration method according to an embodiment of the present invention can be used.

The telecommunication system 100 includes a transmitter (apparatus) TX and a receiver (apparatus) RX. In order to simplify the present description, the telecommunication system 100 includes only a single transmitter TX and a single receiver RX. However, the concepts that will be presented in the following of the description are applicable to more complex (and actual) systems, in which more than one transmitter interact with more than one receiver.

The transmitter TX includes a base-band signals generator (for example, a OFDM modulator) 110 adapted to digitally modulate a data stream DS of bits to be transmitted. More particularly, the base-band signals generator 110 receives the data stream DS and provides two corresponding digitally modulated signals XDi and XDq. Without entering into details not relevant for the purposes of the present description, in case the base-band signals generator 110 is an OFDM modulator, each digitally modulated signal XDi, XDq is generated by properly combining the bits of the data stream DS with a plurality of sinusoidal waves. For example, according to a particular modulation scheme, the (complex) amplitudes of the sinusoidal waves take values depending on the values of the bits of the data stream DS.

The digitally modulated signals XDi and XDq are then provided to a Digital to Analog Converter (DAC) circuit 120, where they are converted into corresponding (analog) baseband signals Xi and Xq, respectively.

The base-band signals Xi, Xq are then provided to an RF quadrature modulator 130—which also receives a carrier wave C0 oscillating at a radio frequency (RF)—where they are modulated and converted to the RF domain. More particularly, as will be described in greater detail in the following of the present description, the base-band signals Xi, Xq are firstly converted to the RF domain and then are added together so as to form an RF modulated signal Y.

The RF modulated signal Y is provided to a power amplifier (PA) 140, which strengthens the RF modulated signal Y for obtaining a corresponding transmission signal YA; the power amplifier 140 then applies the transmission signal YA to a transmitting antenna 150.

The receiver RX includes a receiving antenna 160, adapted to pick up the transmission signal YA; the antenna 160 provides a corresponding reception signal YR to an RF quadrature demodulator 170, which demodulates the reception signal YR into two base-band signals Ri, Rq (corresponding to the base-band signals Xi, Xq).

The base-band signals Ri, Rq are then provided to an Analog to Digital Converter (ADC) 180. The ADC 180 generates two corresponding digitally modulated signals RDi, RQi, which are in turn provided to a base-band signals demodulator 190.

The base-band signals demodulator 190 digitally demodulates the signals RDi, RQi so as to retrieve a data stream RDS of bits corresponding to the data stream DS.

Figure 2A:
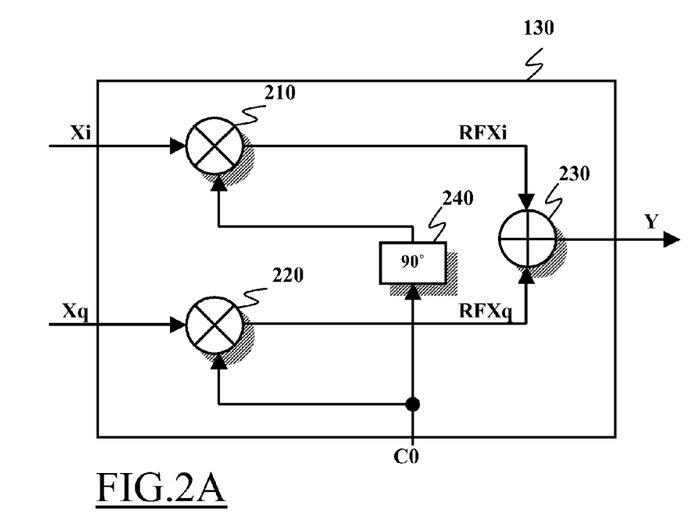
FIG. 2A schematically shows, in terms of simplified functional blocks, an example of how an RF quadrature modulator included in the telecommunication system of FIG. 1 can be structured.

FIG. 2A schematically shows, in terms of simplified functional blocks, an example of how the RF quadrature modulator 130 can be structured.

Particularly, the RF quadrature modulator 130 includes a pair of multipliers 210, 220, an adder 230 and a phase-shifter 240.

The multiplier 220 receives the base-band signal Xq and the carrier wave C0; the multiplier 220 modulates the carrier wave C0 according to the base-band signal Xq, so as to generate a corresponding RF modulated signal RFXq; in a similar way, the base-band signal Xi is provided to the multiplier 210 together with a phase-shifted version of the carrier wave C0 generated by the phase-shifter 240, in order to obtain a corresponding RF modulated signal RFXi. More particularly, the phase-shifter 240 is designed to introduce a phase-shift of 90 degrees on the carrier wave C0, so that the RF modulated signals RFXq, RFXi are in quadrature to each other. The RF modulated signals RFXq, RFXi are then provided to the adder 230 for being summed to each other so as to obtain the RF modulated signal Y.

However, real quadrature modulators are subjected to imperfections (such as gain and phase imbalances) that generate corresponding errors in the RF modulated signal Y. A simple model illustrating how the imbalances can affect the RF quadrature modulator 130 of FIG. 2A is schematically illustrated in FIG. 2B.

Figure 2B:
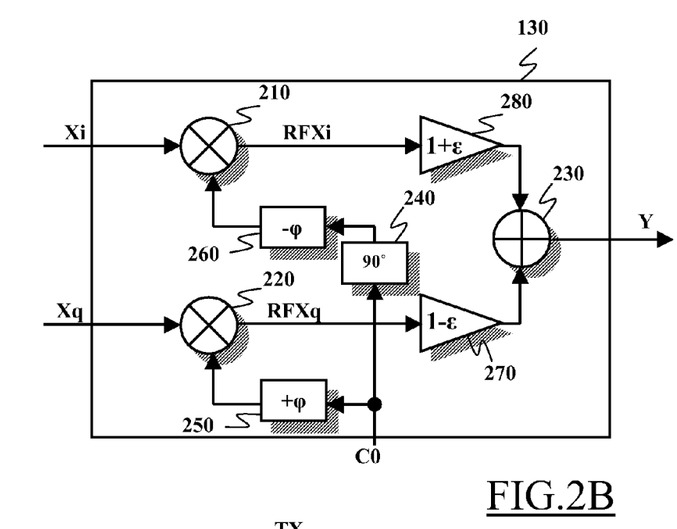
FIG. 2B schematically shows a simple model illustrating how gain and phase imbalances can affect the RF quadrature modulator of FIG. 2A.

In FIG. 2B the phase imbalance is represented by two phase imbalance blocks 250, 260. The phase imbalance block 250 acts on the input of the multiplier 220 receiving the carrier wave C0 by introducing a phase shift A, hereinafter referred to as phase error, while the phase imbalance block 260 acts on the input of the multiplier 210 receiving the shifted carrier wave C0 by introducing a phase error $-\phi$. With this simple model, the RF modulated signals RFXq, RFXi experience an—undesired—phase difference equal to 2 $\phi$.

In a similar way, the gain imbalance is represented in FIG. 2B by means of two gain imbalance blocks 270 and 280 that act on the RF modulated signals RFXq and RFXi, respectively. More particularly, the effect of the gain imbalance block 270 is a reduction of the amplitude of the RF modulated signal RFXq, which is amplified by an amount equal to $(1-\epsilon)$—where the term $\epsilon$, hereinafter referred to as gain error, is a positive number lower than the unity; the effect of the gain imbalance block 280 is instead an increase of the amplitude of the RF modulated signal RFXi, which is amplified by an amount equal to $(1+)$. With this simple model, the RF modulated signals RFXi, RFXq experience an—undesired—gain difference equal to $2\epsilon$.

In order to express the effect of the phase and gain imbalances, we define a fictitious signal X (referred to as equivalent base-band signal) in the following way:

$$X=Xi+jXq,$$

wherein j is the imaginary unity.

Likewise, we express the RF modulated signal Y with its equivalent in the base-band, referred to as base-band modulated signal $Y_{bb}$:

$$Y_{bb}=Yi+jYq$$

(wherein Yi, Yq are the real and imaginary parts thereof).

Therefore, we can express the base-band modulated signal $Y_{bb}$ as a function of the equivalent base-band signal X in the base-band domain:

$$Y_{bb}=(\cos(\phi)+j\epsilon \sin(\phi))X+(\epsilon \cos(\phi)+j \sin(\phi))X^*=\Gamma_1X+\Gamma_2X^*,$$

wherein '*' is the complex conjugate operator, $\Gamma_1=(\cos(\phi)+j\epsilon \sin(\phi))$ and $\Gamma_2=(\epsilon \cos(\phi)+j \sin(\phi))$.

For low values of the phase error $\phi$ and gain error $\epsilon$, the terms $\Gamma_1$ and $\Gamma_2$ can be simplified in the following way:

$$\Gamma_1 \cong 1+j\epsilon\phi$$

$$\Gamma_2 \cong \epsilon+j\phi$$

It can be appreciated that the presence of the phase and gain imbalances generates a signal component proportional to the complex conjugate of the equivalent base-band signal X. This signal component is capable of altering the base-band modulated signal $Y_{bb}$ to an extent such as to dull the performance of the whole telecommunication system.

This can be easily appreciated in case the equivalent base-band signal X is a complex exponential signal oscillating at a frequency $f_t$:

$$X=e^{j(2\pi f_t+\delta)},$$

wherein $\theta$ is the starting phase of the equivalent base-band signal X. Indeed, with such an equivalent base-band signal X, the presence of the phase and gain imbalances in the modulation process generates a base-band modulated signal $Y_{bb}$ that includes an unwanted signal component that oscillates at the frequency $-f_t$ (also referred to as "imagine" frequency of the frequency $f_t$), as can be observed in the following equation:

$$Y_{bb}=\Gamma_1X+\Gamma_2X^*=\Gamma_1e^{j(2\pi f_t+\delta)}+\Gamma_2e^{-j(2\pi f_t+\delta)} \cong (1+j\epsilon\phi)e^{j(2\pi f_t+\delta)}+(\epsilon+j\phi)e^{-j(2\pi f_t+\delta)}.$$

From the above expression it can be appreciated that the higher the values of the phase error $\phi$ and gain error $\epsilon$, the higher the magnitude of the component oscillating at the imagine frequency $-f_t$ that affects the base-band modulated signal $Y_{bb}$, and the higher the degradation of the transmission performance.

Figure 2C:
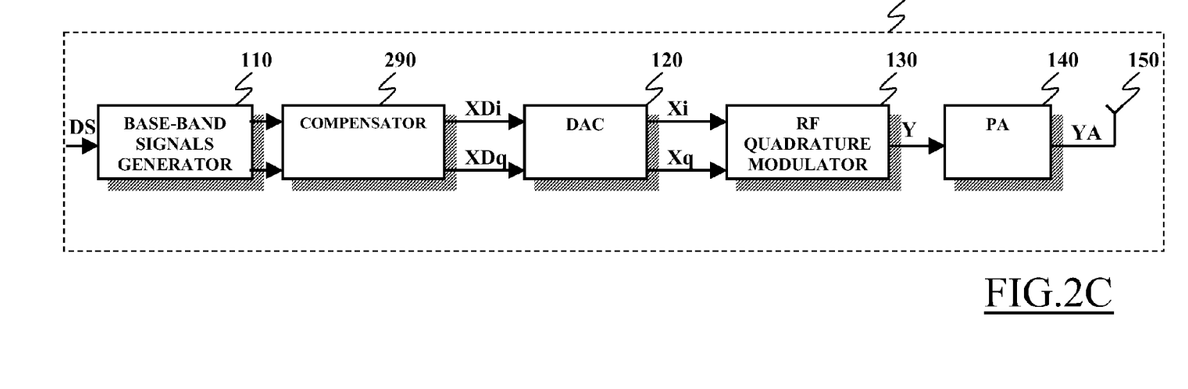
FIG. 2C illustrates a transmitter apparatus included in the telecommunication system of FIG. 1 when it is connected to a compensator.

As illustrated in FIG. 2C, in order to reduce the negative effects of the phase error $\phi$ and gain error $\epsilon$ on the modulation process, a compensator 290 is provided between the base-band signals generator 110 and the DAC circuit 120. The compensator 290 modifies the signals received from the base-band signals generator 110 based on phase and gain compensation parameters $\phi c$, $\epsilon c$ (with the modified signals that are denoted with the same references). The compensation parameters $\phi c$, $\epsilon c$ are determined during a calibration phase that is performed before the transmitter TX is employed for its normal operation.

Figure 3:
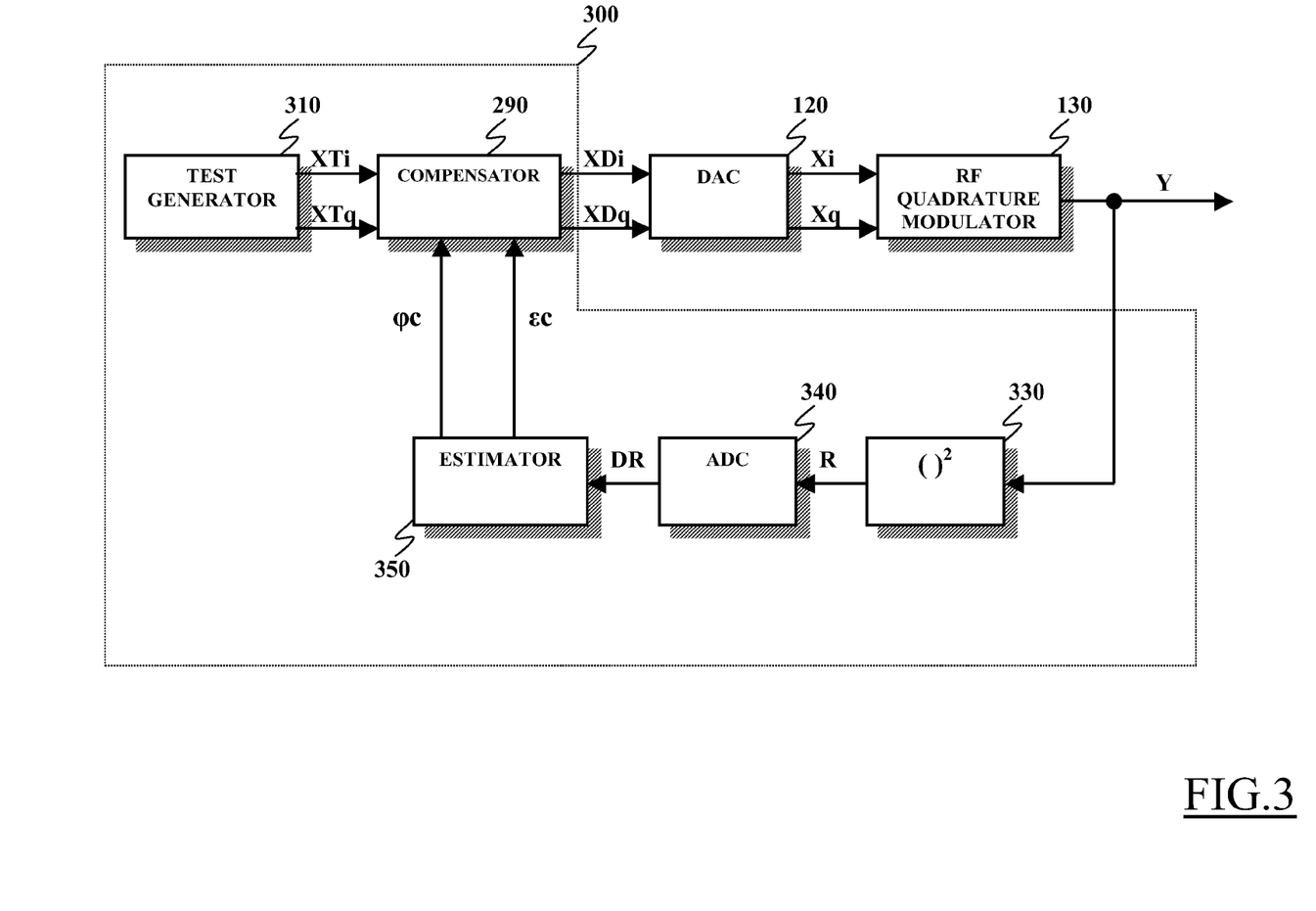
FIG. 3 illustrates a calibration system capable of reducing the negative effects of phase and gain errors on the modulation process caused by the gain and phase imbalances, according to an embodiment of the present invention.

FIG. 3 illustrates a calibration system 300 capable of estimating (during the calibration phase) the compensation parameters $\phi c$, $\epsilon c$.

During the calibration phase, the calibration system 300 generates proper digitally modulated signals XDi, XDq that are provided to the DAC circuit 120. As previously described, the DAC circuit 120 converts the signals into the corresponding base-band signals Xi, Xq that are provided to the RF quadrature modulator 130. The resulting RF modulated signal Y (which, in general, is affected by the phase error $\phi$ and gain error $\epsilon$) is then feedback to the calibration system 300. The calibration system 300 analyzes the RF modulated signal Y for establishing how the transmitter TX has to be calibrated for reducing the effects of the phase error $\phi$ and gain error $\epsilon$, and accordingly generates the compensation parameters $\phi c$, $\epsilon c$.

More particularly, the calibration system 300 includes a test generator 310 for the generation of a pair of test signals XTi, XTq. For example, the test generator 310 is included in the base-band signals generator, and it is deactivated during the normal operation of the transmitter TX; alternatively, the test generator 310 is a dedicated apparatus that is available only during the calibration phase.

The test signals XTi, XTq are provided to the compensator 290, which is also configured to receive the phase compensation parameter $\phi c$ and the gain compensation parameter $\epsilon c$. The compensator 290 modifies the received test signals XTi, XTq and accordingly generates the digitally modulated signals XDi, XDq to be provided to the DAC circuit 120. Particularly, the digitally modulated signals XDi, XDq are given by the following equations:

$$XDi=XTi(1+\epsilon c)+XTq\cdot\phi c$$

$$XDq=XTq(1-\epsilon c)+XTi\cdot\phi c.$$

An example of how the compensator 290 implementing the two previous equations can be structured is shown in "New Methods for Adaptation of Quadrature Modulators and Demodulators in Amplifier Linearization Circuits", J. K. Cavers, Transaction on Vehicular Technology, vol. 46, No. 3, August 1997 (the entire disclosure of which is herein incorporated by reference).

In a solution according to an embodiment of the present invention, as described in detail in the following, the calibration phase for estimating the compensation parameters $\phi c$, $\epsilon c$ provides for the iterative repetition of the same operations on different pairs of test signals XTi, XTq; thus, for the sake of clarity, some of the quantities (e.g., signals and parameters) generated and/or exploited during a generic k-th iteration of the calibration phase will be specifically identified with an index "k".

Particularly, a plurality of pairs of test signals in quadrature to each other are generated. Each pair of test signals is modulated to obtain a corresponding modulated signal. Afterward, the modulated signals are squared, and then converted into the frequency domain. The modulus (or, according to an alternative embodiment of the present invention, the square of the modulus) of the transformed signals so obtained are then stored for being used to estimate the error to be corrected, in order to calculate a corresponding compensation.

In greater detail, all the pairs of test signals XTik, XTqk (with k=0, ..., N−1, such as N=8) oscillate at a same frequency $f_t$, with the test signals of each pair that oscillate with a mutual phase-shift of $\pi/2$ radians. For each pair of test signals XTik, XTqk, we can define a corresponding fictitious signal, referred to as base-band common test signal XTk, in the following way:

$$XTk = XTik + jXTqk = 2V_k \cos(2\pi f_t t),$$

wherein $V_k = \cos(\theta_k) + j \sin(\theta_k)$ and $\theta_k = k(2\pi/N)$. Thus, all the base-band common test signals XTk have the same constant energy (given by the integral of the squared modulus of XTk). Moreover, the constant energy is distributed between the test signals XTik, XTqk of each pair in a different way. For example, in case $\theta_k = 0$ the energy of the base-band common test signal XTk is entirely distributed on the test signal XTik (being XTqk=0), in case $\theta_k = \pi/4$ the energy of the base-band common test signal XTk is evenly distributed between the test signals XTik and XTqk, in case $\theta_k = \pi/2$ the energy of the base-band common test signal XTk is entirely distributed on the test signal XTqk (being XTik=0), and so on.

According to an embodiment of the present invention, the calibration system 300 further includes a non-linear quadratic block 330, for example a Gilbert cell circuit, coupled to the output of the RF quadrature modulator 130 for receiving the RF modulated signal Yk. The non-linear quadratic block 330 calculates a squared modulated signal Rk, whose equivalent in the base band, referred to as base-band squared modulated signal $Rk_{bb}$, is equal to:

$$Rk_{bb} = Yk_{bb} \cdot Yk_{bb}^*.$$

The squared modulated signal Rk is then provided to an ADC 340, which digitalizes the squared modulated signal Rk for providing a digitalized version thereof, referred to as digital squared signal DRk, to an estimator 350.

Then, the estimator 350 calculates the Fourier transform of the base-band squared modulated signal $Rk_{bb}$, denoted as $Fk_{bb}(Rk_{bb}, f)$ (f is a generic frequency):

$$Fk_{bb}(Rk_{bb}, f) = Fk_{bb}(Yk_{bb}, f) * Fk_{bb}(Yk_{bb}, f),$$

wherein "*" is the convolution operator, and $Fk_{bb}(Yk_{bb}, f)$, Fourier transform of the base-band modulated signal Yk, is equal to:

$$Fk_{bb}(Yk_{bb}, f) = (\Gamma_1 Vk + \Gamma_2 Vk^*) \cdot \delta(f - f_t) + (\Gamma_1 Vk + \Gamma_2 Vk^*) \cdot \delta(f + f_t),$$

wherein $\delta(f)$ is the Dirac delta function.

It has to be appreciated that from the Fourier transform $Fk_{bb}(Rk_{bb}, f)$ of the squared modulated signal Rk it is possible to retrieve information regarding the phase error $\phi$ and gain error $\epsilon$ that affect the pair of test signals Xtik, XTqk. More particularly, this can be shown by calculating the Fourier transform $Fk_{bb}(Rk_{bb}, f)$ at a frequency $2f_t$ (i.e., at a frequency that is twice the frequency $f_t$ of the test signals XTik, XTqk):

$$Fk_{bb}(Rk_{bb}, f = 2f_t) = |\Gamma_1 Vk|^2 + |\Gamma_2 Vk|^2 + \Gamma_1 Vk(\Gamma_2 V^*)^* + \Gamma_2 Vk^*(\Gamma_1 V)^* = 2Re\{\Gamma_1 \Gamma_2^* Vk^2\} + (|\Gamma_1|^2 + |\Gamma_2|^2)|Vk|^2.$$

The previous expression can be reduced in the following form:

$$Fk_{bb}(RK_{bb}, f=2f_t) = 2Re\{\Gamma_1 \Gamma_2^* Vk^2\} + 1 + \epsilon^2,$$

which can be still further approximated, by considering low values of the phase error $\phi$ and gain error $\epsilon$ and by expressing Vk as a function of $\theta_k$:

$$Fk_{bb}(Rk_{bb}, f=2f_t) \cong 2[\epsilon \cos(2\theta_k) + \phi \sin(2\theta_k)] + 1.$$

As can be seen, since the value of $\theta_k$ is known for each pair of test signals XTik, XTqk, the expression only depends on the phase error $\phi$ and the gain error E. It has to be noted that for phase errors $\phi$ and gain errors E that are <<1, the Fourier transform $Fk_{bb}(Rk_{bb}, f=2f_t)$ is always positive and real. Thanks to this feature, it is not required to exactly known the propagation delay of the signals involved during the calibration phase. Indeed, since the unpredictable propagation delay is capable of altering only the phase of $Fk_{bb}(Rk_{bb}, f=2f_t)$, and not the amplitude thereof (in other words, $Fk_{bb}(Rk_{bb}, f=2f_t)$ may be subjected to a complex rotation), its modulus remains always the same. As will be described in detail in the following of the present description, the modulus of the various Fourier transforms $Fk_{bb}(Rk_{bb}, f=2f_t)$ calculated from each pair of test signals XTik, XTqk—referred to as partial error indicators $M_k$—are combined to each other, in order to estimate the phase error $\phi$ and the gain error $\epsilon$ affecting the transmitter TX. Particularly, the partial error indicator $M_k$ may be approximated as:

$$M_k = Fk_{bb}(Rk_{bb}, f=2f_t) \cong |2[\epsilon \cos(2\theta_k) + \phi \sin(2\theta_k)] + 1|.$$

Figure 4:
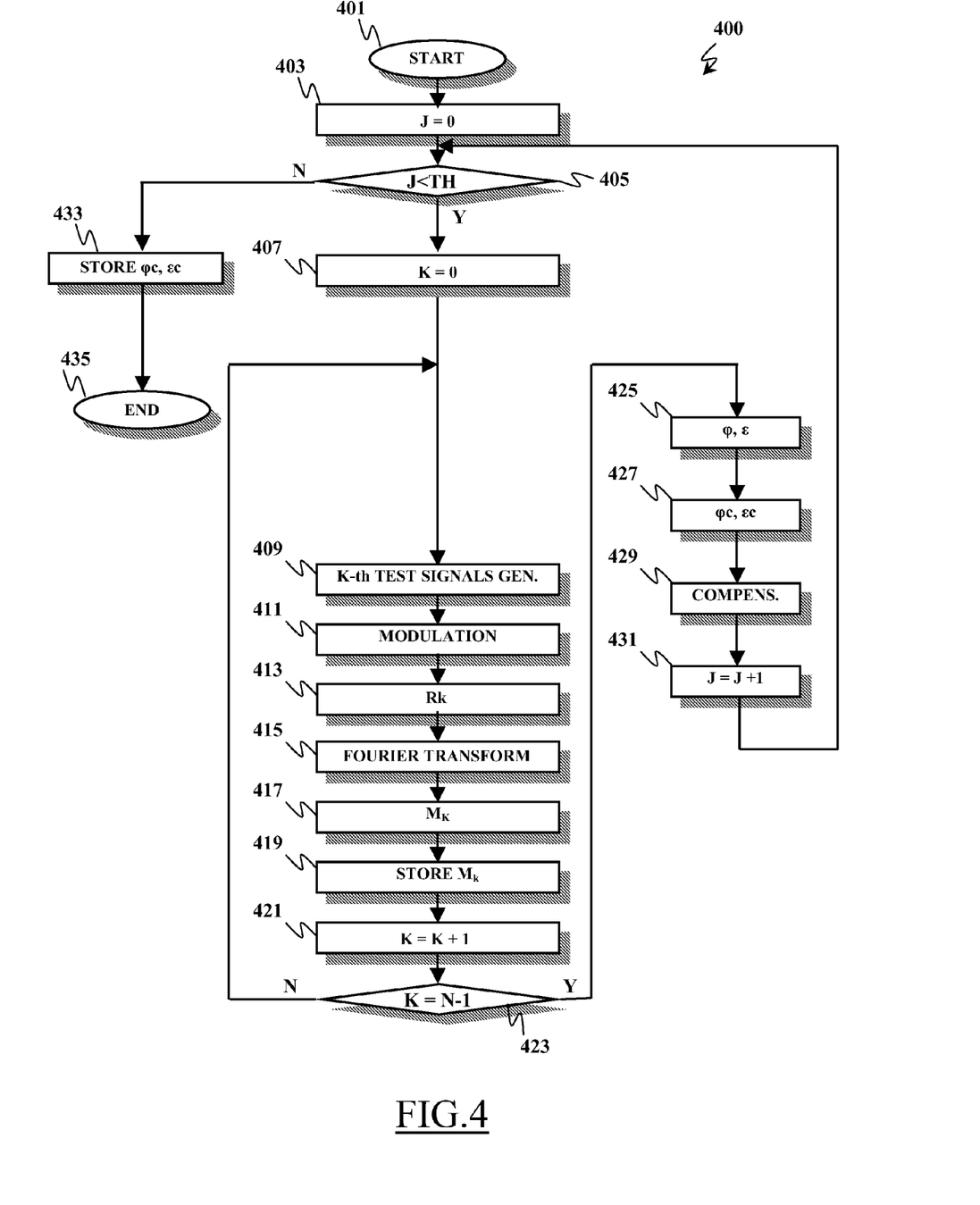
FIG. 4 shows a flow chart illustrating the operations performed during a calibration phase performed by the calibration system of FIG. 3 according to an embodiment of the present invention.

In order to describe how the partial error indicators $M_k$ are combined for estimating the phase error $\phi$ and the gain error $\epsilon$, and how the calibration system operates according to an embodiment of the present invention, reference will be now made to FIG. 4, which shows a flow chart 400 illustrating the operations performed during the calibration phase.

According to an embodiment of the present invention, the calibration phase illustrated by the flow chart 400 provides for the cyclic iteration of an external loop.

The flow of activity of the calibration phase initiates at block 401, and then passes to block 403, wherein a counter j (defining the j-th iteration of the external loop) is set to zero. The flow of activity proceeds to block 405, wherein the calibration system checks if the counter j has reached or not a threshold TH (such as 2-3), whose value depends on the desired accuracy of the calibration process.

If the counter j is lower than the threshold value TH (exit branch "Y"), the flow of activity continues to block 407, wherein the index k (identifying the k-th pair of test signals XTik, XTqk) is set to zero.

The method then enters an internal loop at the block 409, wherein the k-th pair of test signals XTik, XTqk are generated as previously described (i.e., by setting $V_k = \cos(\theta_k) + j \sin(\theta_k)$ and $\theta_k = k(2\pi/N)$). The digitally modulated signals XDik, XDqk are then set equal to the test signals XTik, XTqk.

Then the flow of activity passes to block 411, wherein the digitally modulated signals XDik, XDqk are converted into the base-band signals Xik, Xqk; the base-band signals Xik, Xqk are then provided to the RF quadrature modulator, which accordingly generates the base-band modulated signal Yk.

Continuing to block 413, the base-band modulated signal Yk is provided to the non-linear quadratic block, which calculates the squared modulated signal Rk. The squared modulated signal Rk is converted into the corresponding digital squared signal DRk, which is provided to the estimator.

At block 415, the estimator calculates the Fourier transform of the squared modulated signal Rk; then, at block 417, the partial error indicator Mk is set to the modulus of the Fourier transform at the frequency $2f_t$ (i.e., $Mk = |2[\epsilon \cos(2\theta_k) + \phi \sin(2\theta_k)] + 1|$). The partial error indicator Mk is then stored by the estimator at the block 419.

The k-th iteration of the internal loop terminates at the block 421, wherein the index k is incremented by one.

At this point, the flow of activity proceeds to block 423, wherein the calibration system checks if the index k has reached or not the value N−1. If not (exit branch "N"), the flow of activity returns back to block 409, and a new iteration of the internal loop is performed, with a different pair of test signals XTik, XTqk.

On the other hand, in case k has reached the value N−1 (exit branch "Y"), the internal loop is exit, and the flow of activity continues to block 425, wherein the estimator combines the N partial error indicators Mk (k=0 to N−1), in order to estimate the phase error $\phi$ and the gain error $\epsilon$ affecting the modulation process.

More particularly, the estimator arranges the partial error indicators Mk into an error indicator vector $\underline{M}$ in the following way:

$$\underline{M} = \begin{bmatrix} M0 \\ \vdots \\ Mk \\ \vdots \\ M(N-1) \end{bmatrix}.$$

Then, according to an embodiment of the present invention, the phase error $\phi$ and the gain error $\epsilon$ are estimated using the least min squares method, according to the following equation:

$$\begin{bmatrix} \varepsilon \\ \varphi \end{bmatrix} = \frac{1}{N} \underline{\Theta}^T \cdot \underline{M},$$

wherein $\Theta$ (referred to as offset matrix) is a 8×N matrix equal to:

$$\underline{\Theta} = \begin{bmatrix} \cos(2\theta_0) & \sin(2\theta_0) \\ \vdots & \vdots \\ \cos(2\theta_k) & \sin(2\theta_k) \\ \vdots & \vdots \\ \cos(2\theta_{N-1}) & \sin(2\theta_{N-1}) \end{bmatrix},$$

and "T" is the transpose symbol.

According to an embodiment of the present invention N is advantageously set to 8, in such a way that:

$$\theta_k = k\left(\frac{2\pi}{N}\right) = k\left(\frac{\pi}{4}\right),$$

and, thus, the elements of the offset matrix $\Theta$ only takes values that are simple to calculate, i.e., "0", "1" or "−1".

The flow of activity then continues to block 427, wherein the estimator calculates the phase compensation parameter $\phi c$ and the gain compensation parameter $\epsilon c$ for compensating the phase error $\phi$ and the gain error $\epsilon$ that have been estimated. For example, according to an embodiment of the present invention, the values of the phase compensation parameter $\phi c$ and of the gain compensation parameter $\epsilon c$ are set to the opposite of the phase error $\phi$ and of the gain error $\epsilon$, respectively, previously calculated.

The flow of activity passes now to block 429, wherein the phase compensation parameter $\phi c$ and the gain compensation parameter $\epsilon c$ are provided to the compensator; then, at block 431, the index j is incremented by one (this means that the flow of activity is configured to initiate a further (j+1)-th iteration of the external loop).

The operations performed by the calibration system during the further (j+1)-th iteration of the external loop are the same as those previously described; the only difference consists in the fact that the test signals XTik, XTqk generated at each k-th iteration of the internal loop are now compensated by the compensator with the phase compensation parameter $\phi c$ and the gain compensation parameter $\epsilon c$ calculated in the previous j-th iteration of the external loop.

It has to be appreciated that the repetition of the external loop is advantageously performed by the calibration system to guarantee an effective and precise compensation of the modulation errors: indeed, the process of calculating the partial error indicators Mk requires the use of some approximations, that may affect the compensation results. By repeating all these operations more than once (more particularly, a number of times equal to the threshold value TH), it is assured that the negative effects of the approximations are diminished.

Referring again to the block 405, when the index "f" has reached the threshold value TH, the flow of activity proceeds to block 433, wherein the compensation parameters $\phi c$, $\epsilon c$ that have been calculated in the last iteration of the external loop are stored; these values may then be used in the transmitter during its normal operation for counterbalancing the negative effects of the errors on the modulation process. The method then ends at the final block 435.

It has to be appreciated that the solution previously described requires that the estimator should perform operations directed to the computation of a modulus (i.e., the modulus of the Fourier transform of the squared modulated signal Rk). This operations are quite complex, since they include the calculation of a square root, and require a non negligible amount of computing resources from the estimator.

Thus, according to an alternative embodiment of the present invention, the estimator can be implemented in a simpler way by choosing to consider, during the calibration phase, the squared modulus of the Fourier transform, instead of the modulus only.

More particularly, according to this alternative solution, the partial error indicator Mk is calculated in the following way:

$$Mk = |Fk(Rk, f=2f_t)|^2 \cong 4[\epsilon \cos(2\theta_k) + \phi \sin(2\theta_k)] + 1,$$

and the phase error $\phi$ and the gain error $\epsilon$ are estimated according to the following equation:

$$\begin{bmatrix} \varepsilon \\ \varphi \end{bmatrix} = \frac{1}{2N} \underline{\Theta}^T \cdot \underline{M}.$$

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, the proposed solution may be implemented with an equivalent method (using similar steps, removing non essential steps or adding optional steps).

The concepts of the present invention are also applicable in case the test signals of each pair have phase differences that are slightly different than 90 degrees; similar considerations apply in case the pairs of test signals have energies that are not equal, but instead differ by a small amount.

Likewise, the partial error indicators may be obtained from the transformed signal in an equivalent way.

In any case, the concepts of the present invention are also applicable in case the modulated signal is generated in an equivalent manner.

Even though reference has been made to the Fourier transform, similar considerations apply in case the frequency selection of the squared signal is performed in another way.

The concepts of the present invention are also applicable in case the modulus of the Fourier transform of the squared signal is calculated at a frequency that is slightly different from twice the test frequency.

Even though less efficient, it is not excluded to calculate only the phase compensation and not the gain compensation, or vice versa; in this way only one among the phase error and the gain error is compensated.

Similar considerations apply in case the modulation errors include different errors other than the phase and gain errors.

Even though reference has been made to a calibration system for a transmitter apparatus that includes an OFDM modulator, the proposed solution may be applied to different transmitter apparatuses, in which the modulation is carried out in a different way.

Transmitters including embodiments of the present invention may be contained in a variety of different types of electronic systems and devices, such as cellular telephones, personal digital assistants, computer systems, and so on.

From the foregoing it will be appreciated that, although specific embodiments of the invention have been described herein for purposes of illustration, various modifications may be made without deviating from the spirit and scope of the invention.

What is claimed is:

1. A calibration method for reducing modulation errors in a telecommunication transmitter apparatus, the calibration method including the steps of:
   providing a plurality of pairs of test signals, the test signals of each pair being substantially in quadrature to each other, wherein the pairs of test signals have a substantially equal energy and are at least in part different;
   generating a plurality of modulated signals, each modulated signal being generated by modulating a corresponding pair of test signals;
   calculating a plurality of transformed signals each one corresponding to the square of a corresponding modulated signal in the frequency domain;
   calculating a plurality of partial error indicators each one as a function of the modulus of a corresponding transformed signal, the partial error indicators being indicative of the modulation errors associated with the modulated signals;
   calculating a compensation for counterbalancing the modulation errors according to a combination of the partial error indicators; and
   storing an indication of the compensation for the application of the compensation to each further pair of operative signals during operation of the telecommunication transmitter apparatus.

2. The calibration method of claim 1, wherein the step of generating the modulated signals includes:
   modulating the test signals of each pair with a carrier wave, and
   obtaining each modulated signal by combining the corresponding modulated test signals.

3. The calibration method of claim 2, wherein the step of calculating the transformed signals includes calculating a Fourier transform of each squared signal.

4. The calibration method of claim 3, wherein the test signals oscillate at a test frequency, the step of calculating the partial error indicators including:
   calculating the modulus of the Fourier transform of each squared signal at a frequency equal to twice the test frequency, and
   setting each partial error indicator according to the corresponding modulus.

5. The calibration method of claim 4, wherein each modulation error includes a phase error indicative of an undesired phase offset between the modulated signals and a gain error indicative of an undesired amplitude offset between the modulated signals, the step of calculating the compensation including:
   calculating a phase compensation for counterbalancing the phase error and a gain compensation for counterbalancing the gain error.

6. The calibration method of claim 5, wherein each test signal of the plurality has a corresponding amplitude offset and a corresponding phase offset with respect to the amplitude and the phase of a reference one of the test signals, the step of calculating the phase compensation and the gain compensation including:
   generating a plurality of partial compensations each one being obtained by combining a partial error indicator with an offset indicator indicative of the amplitude and phase offsets of a corresponding pair of test signals, and combining the partial compensations.

7. The calibration method of claim 6, wherein each offset indicator includes a first offset indicator term equal to the cosine of twice an offset angle and a second indicator term equal to the sine of twice the offset angle, and wherein each pair of test signals includes a first test signal having an amplitude that is proportional to the cosine of the offset angle and a second test signal having an amplitude that is proportional to the sine of the offset angle, the second test signal having a phase that differs from a phase of the corresponding first test signal in the pair by 90 degrees.

8. The calibration method of claim 7, wherein the step of generating the partial compensations includes, for each partial error indicator:
   generating a corresponding gain partial compensation by multiplying the partial error indicator with the corresponding first offset indicator term, and
   generating a corresponding phase partial compensation by multiplying the partial error indicator with the corresponding second offset indicator term.

9. The calibration method of claim 8, wherein the step of combining the partial compensations includes:
   calculating a first term by summing the gain partial compensations, and
   calculating a second term by summing the phase partial compensations.

10. The calibration method of claim 9, wherein each pair of test signals is associated with a different corresponding offset angle, the reference signal being associated with a null offset angle.

11. The calibration method of claim 10, wherein the step of setting the partial error indicator according to the modulus includes setting the partial error indicator to the modulus, the step of calculating the gain compensation includes setting the gain compensation to the first term divided by the number of different offset angles, and the step of calculating the phase compensation includes setting the phase compensation to the second term divided by the number of different offset angles.

12. The calibration method of claim 10, wherein the step of setting the partial error indicator according to the modulus includes setting the partial error indicator to the square of the modulus, the step of calculating the gain compensation includes setting the gain compensation to the first term divided by twice the number of different offset angles, and the step of calculating the phase compensation includes setting the phase compensation to the second term divided by twice the number of different offset angles.

13. The calibration method of claim 10, wherein the offset angles are arranged in an ordered sequence, with each offset angle in the sequence that differs from the preceding and/or following offset angle in the sequence by a constant amount.

14. The calibration method of claim 13, wherein the offset angles are eight, and the constant amount is equal to 45 degrees.

15. A computer program product including a computer-usable medium embodying a computer program, the computer program when executed on a calibration system causing the system to perform a calibration method for reducing modulation errors in a telecommunication transmitter apparatus, wherein the method includes the steps of:
providing a plurality of pairs of test signals, the test signals of each pair being substantially in quadrature to each other, wherein the pairs of test signals have a substantially equal energy and are at least in part different;
generating a plurality of modulated signals, each modulated signal being generated by modulating a corresponding pair of test signals;
calculating a plurality of transformed signals each one corresponding to the square of a corresponding modulated signal in the frequency domain;
calculating a plurality of partial error indicators each one as a function of the modulus of a corresponding transformed signal, the partial error indicators being indicative of the modulation errors associated with the modulated signals;
calculating a compensation for counterbalancing the modulation errors according to a combination of the partial error indicators; and
storing an indication of the compensation for the application of the compensation to each further pair of operative signals during operation of the telecommunication transmitter apparatus.

16. A calibration system for reducing modulation errors in a telecommunication transmitter apparatus, the calibration system including:
means for providing a plurality of pairs of test signals, the test signals of each pair being substantially in quadrature to each other, wherein the pairs of test signals have a substantially equal energy and are at least in part different;
means for generating a plurality of modulated signals, each modulated signal being generated by modulating a corresponding pair of test signals;
means for calculating a plurality of transformed signals each one corresponding to the square of a corresponding modulated signal in the frequency domain;
means for calculating a plurality of partial error indicators each one as a function of the modulus of a corresponding transformed signal, the partial error indicators being indicative of the modulation errors associated with the modulated signals;
means for calculating a compensation for counterbalancing the modulation errors according to a combination of the partial error indicators; and
means for storing an indication of the compensation for the application of the compensation to each further pair of operative signals during operation of the telecommunication transmitter apparatus.

17. A calibration system for reducing modulation errors in a telecommunication transmitter apparatus, the calibration system including:
a test generator circuit for providing a plurality of pairs of test signals, the test signals of each pair being substantially in quadrature to each other, wherein the pairs of test signals have a substantially equal energy and are at least in part different;
a modulator circuit for generating a plurality of modulated signals, each modulated signal being generated by modulating a corresponding pair of test signals; and
an estimator circuit adapted to:
calculate a plurality of transformed signals each one corresponding to the square of a corresponding modulated signal in the frequency domain;
calculate a plurality of partial error indicators each one as a function of the modulus of a corresponding transformed signal, the partial error indicators being indicative of the modulation errors associated with the modulated signals;
calculate a compensation for counterbalancing the modulation errors according to a combination of the partial error indicators; and
store an indication of the compensation for the application of the compensation to each further pair of operative signals during operation of the telecommunication transmitter apparatus.

18. A transmitter apparatus including a calibration system for reducing modulation errors, the calibration system including:
means for providing a plurality of pairs of test signals, the test signals of each pair being substantially in quadrature to each other, wherein the pairs of test signals have a substantially equal energy and are at least in part different;
means for generating a plurality of modulated signals, each modulated signal being generated by modulating a corresponding pair of test signals;
means for calculating a plurality of transformed signals each one corresponding to the square of a corresponding modulated signal in the frequency domain;
means for calculating a plurality of partial error indicators each one as a function of the modulus of a corresponding transformed signal, the partial error indicators being indicative of the modulation errors associated with the modulated signals;
means for calculating a compensation for counterbalancing the modulation errors according to a combination of the partial error indicators; and means for storing an indication of the compensation for the application of the compensation to each further pair of operative signals during operation of the telecommunication transmitter apparatus.

19. A transmitter apparatus including a calibration system for reducing modulation errors, the calibration system including:

a test generator circuit for providing a plurality of pairs of test signals, the test signals of each pair being substantially in quadrature to each other, wherein the pairs of test signals have a substantially equal energy and are at least in part different;

a modulator circuit for generating a plurality of modulated signals, each modulated signal being generated by modulating a corresponding pair of test signals; and an estimator circuit adapted to:
calculate a plurality of transformed signals each one corresponding to the square of a corresponding modulated signal in the frequency domain;
calculate a plurality of partial error indicators each one as a function of the modulus of a corresponding transformed signal, the partial error indicators being indicative of the modulation errors associated with the modulated signals;
calculate a compensation for counterbalancing the modulation errors according to a combination of the partial error indicators; and
store an indication of the compensation for the application of the compensation to each further pair of operative signals during operation of the telecommunication transmitter apparatus.

* * * * *